United States Patent [19]
Lambert et al.

[11] Patent Number: 5,861,230
[45] Date of Patent: Jan. 19, 1999

[54] PROCESS FOR THE POLYMERIZATION OF 4-VINYL PYRIDINE MONOMERS

[75] Inventors: Shawn P. Lambert, Marlborough; Xiaojia Z. Wang, Acton, both of Mass.

[73] Assignee: Polaroid Corporation, Cambridge, Mass.

[21] Appl. No.: 843,817

[22] Filed: Apr. 21, 1997

[51] Int. Cl.$^6$ .............................. C08L 1/08; C08L 77/00
[52] U.S. Cl. ..................... 430/202; 430/941; 524/459; 526/265; 526/202; 546/329; 546/352
[58] Field of Search .................................. 546/329, 352; 526/202, 219.1, 265; 430/202, 941; 525/59; 524/459

[56] References Cited

U.S. PATENT DOCUMENTS

| | | | |
|---|---|---|---|
| 3,148,061 | 9/1964 | Haas | 430/238 |
| 3,208,964 | 9/1965 | Valle, Jr. | 524/459 |
| 3,507,846 | 4/1970 | Haas | 526/202 |
| 4,080,346 | 3/1978 | Bedell | 526/265 |
| 4,346,202 | 8/1982 | Cohen | 526/83 |
| 4,788,242 | 11/1988 | Takahashi | 524/459 |
| 5,294,686 | 3/1994 | Fiarman | 526/233 |

*Primary Examiner*—John Kight
*Assistant Examiner*—D. Margaret M. Mach
*Attorney, Agent, or Firm*—Jennifer A. Kispert

[57] ABSTRACT

There is described a novel process of polymerizing 4-vinyl pyridine monomer in an aqueous polymerization system which comprises preparing an aqueous solution of polyvinyl alcohol, and contacting said aqueous solution of a polyvinyl alcohol with less than about 10% by weight of 4-vinyl pyridine monomer and a water-soluble initiator capable of decomposing to give free radicals.

The resultant dispersion of the novel polymerization process comprises a homogeneous, i.e., weight average molecular weight and particle size, poly-4-vinylpyridine, with no appreciable residual 4-vinyl pyridine monomer.

The resultant dispersion may be used to coat image- and ink-receiving layers of image-recording materials and ink jet recording sheets, respectively.

21 Claims, No Drawings

PROCESS FOR THE POLYMERIZATION OF 4-VINYL PYRIDINE MONOMERS

The present invention relates to the polymerization of 4-vinyl pyridine monomers, and more specifically, it relates to a novel process for polymerizing 4-vinyl pyridine monomers in the presence of a polyvinyl alcohol and a water-soluble initiator.

BACKGROUND OF THE INVENTION

U.S. Pat. No. 3,148,061 describes a method for polymerizing 4-vinyl pyridine monomers using a water-insoluble initiator, i.e, benzoyl peroxide.

U.S. Pat. No. 3,208,964 describes a process for polymerizing 2- or 4-vinyl pyridine monomers in the presence of a polyvinyl alcohol and a water-insoluble initiator, such as, for example, benzoyl peroxide.

U.S. Pat. No. 3,507,856 describes a process for polymerizing vinyl pyridine monomers in the presence of a polyvinyl alcohol and a slightly water-soluble initiator, such as, for example, acetyl peroxide or 2,2'-azobis(methylpropiontrile).

As is generally known in the art, the vinyl pyridine monomers and the initiator are kept separate prior to the polymerization reaction to avoid premature interactions, especially in large-scale production. However, given the limited water solubility of the vinyl pyridine monomer and the initiators as described in the above-mentioned patents, there exists a possibility that, in aqueous polymerization processes, nonuniform reaction initiation, and progression therefrom, may occur, leading, in part, to the presence of appreciable residual vinyl pyridine monomer.

Therefore, it was postulated herein that the use of a water-soluble initiator would facilitate uniform initiation, and thus, result in less, if any, residual 4-vinyl pyridine monomer. It was also thought that use of relatively low amounts of the 4-vinyl pyridine monomer would enable the majority of the 4-vinyl pyridine monomer to be solubilized in water and, thus, would encourage its timely interaction with the water-soluble initiator in such aqueous polymerization processes, and result in a more homogeneous, i.e., weight average molecular weight and particle size, poly-4-vinylpyridine.

It has now been unexpectedly discovered that a process for polymerizing 4-vinyl pyridine monomer in the presence of polyvinyl alcohol which utilizes a water-soluble initiator results in a homogeneous dispersion of poly-4-vinylpyridine, as well as, less if any residual 4-vinyl pyridine monomer.

Therefore, while the aforementioned methods for polymerizing vinyl pyridine monomers are generally suitable for the applications described respectively therein, nonetheless, investigations continue to be pursued to develop novel and improved ways to polymerize vinyl pyridine monomers to provide further advantages.

It is therefore an object of the present invention to provide a novel process for the polymerization of 4-vinyl pyridine monomers.

It is another object of the present invention to provide a novel process for the polymerization of 4-vinyl pyridine monomers in the presence of a polyvinyl alcohol and a water-soluble initiator.

It is another object of the present invention to provide a novel process for the polymerization of 4-vinyl pyridine monomer which results in a homogeneous dispersion of poly-4-vinylpyridine polymer.

It is yet another object of the present invention to provide a novel process for the polymerization of 4-vinyl pyridine monomer which results in no appreciable residual 4-vinyl pyridine monomer.

It is a further object of the present invention to provide a coating fluid prepared by the novel polymerization process.

It is yet a further object of the present invention to provide a coating fluid prepared by the novel polymerization process to coat an ink-receiving layer of an ink jet recording sheet or an image-receiving layer of an image-recording material.

It is a yet another object of the present invention to provide a novel process for polymerizing 4-vinyl pyridine monomers which, when scaled-up for the preparation of larger volumes of coating solutions, allows for better control of the initiation of the polymerization process and prevents any appreciable accumulation of residual 4-vinyl pyridine monomer.

SUMMARY OF THE INVENTION

These and other objects and advantages are accomplished in accordance with the invention by providing a process for polymerizing 4-vinyl pyridine monomers in the presence of a polyvinyl alcohol and a water-soluble initiator.

The process of polymerizing 4-vinyl pyridine monomer comprises the steps of contacting, in water, an aqueous solution of polyvinyl alcohol with less than about 10% by weight of 4-vinyl pyridine monomer and a water-soluble initiator capable of decomposing to give free radicals.

The aqueous solution of polyvinyl alcohol, less than about 10% by weight of 4-vinyl pyridine monomer and water-soluble initiator may be added to one another in any suitable order, such as, for example, the aqueous solution of polyvinyl alcohol may be contacted with the 4-vinyl pyridine monomer, and then, the resultant mixture further contacted with the water-soluble initiator, or, the aqueous solution of polyvinyl alcohol may be contacted with the water-soluble initiator, and then, the resultant mixture further contacted with the 4-vinyl pyridine monomer.

When it is preferred to contact the aqueous solution of polyvinyl alcohol with the 4-vinyl pyridine monomer, and then, to further contact the resultant mixture with the water-soluble initiator, the process of polymerizing 4-vinyl pyridine in a polymerization system which contains from about 80% to about 93% by weight of water, includes the steps of:

(a) preparing an aqueous solution of from about 2% by weight to about 10% by weight of a polyvinyl alcohol, and heating said solution to a temperature of from about 40° C. to less than about 100° C.;

(b) adding less than about 10% by weight of 4-vinyl pyridine monomer to said polyvinyl alcohol solution while maintaining said temperature; and (c) adding an essentially oxygen-free, 10% aqueous solution of a water-soluble initiator, said water-soluble initiator being present in an amount from about 0.5 mol % to about 4.0 mol % of said 4-vinyl pyridine monomer, to the mixture of step (b), at about said temperature, and incubated for from about one (1) hour to about three (3) hours at about said temperature.

When it is preferred to contact the aqueous solution of a polyvinyl alcohol with the water-soluble initiator, and then, to further contact the resultant mixture with the 4-vinyl pyridine monomer, the process of polymerizing 4-vinyl pyridine in a polymerization system which contains from about 80% to about 93% by weight of water, includes the steps of:

(a') preparing an aqueous solution of from about 2% by weight to about 10% by weight of a polyvinyl alcohol, and heating said solution to a temperature of from about 40° C. to less than about 100° C.;

(b') adding an essentially oxygen-free, 10% aqueous solution of a water-soluble initiator, said water-soluble initiator being present in an amount from about 0.5 mol % to about 4.0 mol % of said 4-vinyl pyridine monomer, to said polyvinyl alcohol solution, at about said temperature, while maintaining said temperature; and (c') slowly adding less than about 10% by weight of 4-vinyl pyridine monomer to the mixture of step (b') and incubating for from about one (1) hour to about three (3) hours at about said temperature.

The remaining water-soluble initiator in the resultant fluid of step (c) or step (c'), if any, may be destroyed by step (d), i.e., heating the resultant fluid to from about 90° C. to about 100° C. for from about thirty (30) minutes to about two (2) hours.

The resultant fluid of the polymerization process of the present invention may be used in a variety of applications, such as, for example, in preferred embodiments to coat image- and ink-receiving layers of image-recording materials and ink jet recording sheets, respectively. When the resultant fluid of the polymerization process of the present invention is intended to be used for these preferred applications, the above-described process, i.e., step (a) through step (d), preferably, further comprises the steps of:

(e) cooling the resultant fluid of step (d); and (f) adding an aqueous solution of acid in the amount of at least about 40% by weight of acid to the 4-vinyl pyridine monomer while stirring for from about thirty (30) minutes to about one (1) hour.

Since the resultant polymer of the polymerization process, i.e., poly-4vinylpyridine is essentially insoluble in water, step (e) and step (f) are preferably performed to enable the polymerized product to be coated from a homogeneous solution. In a preferred embodiment where the resultant solution has already been allowed to cool, only step (f), as opposed to step (e) and step (f), is performed.

It has been found that the polymerization of 4-vinyl pyridine monomer in the polymerization system of the present invention results in a homogeneous, i.e., weight average molecular weight and particle size, fluid of poly-4-vinylpyridine, as well as, less if any residual 4-vinyl pyridine monomer. In addition, ink jet recording sheets and image-recording materials comprising ink- and image-receiving layers, respectively, which include poly-4-vinylpyridine prepared according to the polymerization process of the present invention, exhibit desirable characteristics, such as, for example, image quality or background ($D_{min}$).

These and other objects and advantages which are provided in accordance with the invention will in part be obvious and in part be described hereinafter in conjunction with the detailed description of various preferred embodiments of the invention. The invention accordingly comprises the processes involving the several steps and relation and order of one or more of such steps with respect to each of the others, and the product and compositions possessing the features, properties and relation of elements which are exemplified in the following detailed disclosure, and the scope of the application of which will be indicated in the claims.

For a fuller understanding of the nature and objects of the invention, reference should be had to the following detailed description of the preferred embodiments.

DETAILED DESCRIPTION OF THE PREFERRED EMBODIMENTS

The polyvinyl alcohol, 4-vinyl pyridine monomer and the water-soluble initiator which are suitable for use in the present invention are known compounds and, as such, may be prepared using techniques which are well known to those of skill in the art.

In addition, suitable polyvinyl alcohols, 4-vinyl pyridine monomer and water-soluble initiator are commercially available, respectively, under the tradename Airvol from Air Products and Chemicals, Inc. (Allentown, Pa.), Reilly Industries, Inc. (Indianapolis, Ind.) and, under the tradename V50, from Wako Chemical, USA Inc. (Richmond, Virginia). The preferred polyvinyl alcohols are Airvol® 350 and Airvol® 540. The preferred water-soluble initiator is 2,2'-azobis(2-amidinopropane) hydrochloride (V50®). However, any similar materials may be used if they are capable of functioning in the polymerization process of the present invention for the purposes recited.

The polyvinyl alcohol, 4-vinyl pyridine monomer and water-soluble initiator may be used in any amount which is required to accomplish their intended purposes. It will be appreciated by those of skill in the art that the respective amounts of these materials necessary in any specific instance is dependent upon a number of factors, such as, e.g., the preferred weight average molecular weight, particle size of the resultant polymer, molecular weight distribution, and residual monomer content.

For example, in a preferred embodiment of the present invention, the amount of water-soluble initiator is from about 0.7 mol % to about 3.0 mol % of water-soluble initiator to 4-vinyl pyridine monomer which results in a weight average molecular weight of from about 300,000 to about 100,000 of poly-4-vinylpyridine, respectively. Also, in another preferred embodiment of the present invention, the amount of water-soluble initiator is from about 1.0 mol % to about 1.5 mol % of water-soluble initiator to 4-vinyl pyridine monomer which results in a weight average molecular weight of from about 250,000 to about 200,000 of poly-4-vinylpyridine, respectively.

As stated earlier, any suitable amount of any suitable, e.g., grade, polyvinyl alcohol may be used in the polymerization process of the present invention. In a preferred embodiment of the present invention, the amount of polyvinyl alcohol is from about 2% by weight to about 10% by weight. In a particularly preferred embodiment of the present invention, the amount of polyvinyl alcohol is from about 2% by weight to about 8% by weight.

As is known in the art, polyvinyl alcohol may be used as a suspending agent or an emulsifier in the polymerization of vinyl pyridine monomer; hence, the amount of polyvinyl alcohol used in the polymerization process of the present invention will generally be chosen based upon, in part, the amount of 4-vinyl pyridine monomer selected.

For example, in a preferred embodiment of the present invention, the amount of polyvinyl alcohol used is in a range, by weight, of from about 4:1 to about 1:2 of polyvinyl alcohol to 4-vinyl pyridine monomer. In a particularly preferred embodiment of the present invention, the amount of polyvinyl alcohol used is a ratio, by weight, of 1:1, 1:2 or 2:1 of polyvinyl alcohol to 4-vinyl pyridine monomer. In an especially preferred embodiment of the present invention, the amount of polyvinyl alcohol used is a ratio, by weight, of 2:1 of polyvinyl alcohol to 4-vinyl pyridine monomer.

The aqueous solution of polyvinyl alcohol selected for use in the polymerization process of the present invention may be prepared, e.g., solubilized, by any method known to the art. In a preferred embodiment, the polyvinyl alcohol is solubilized in essentially oxygen-free water at a temperature from about 85° C. to about 100° C. in an inert atmosphere, e.g., under nitrogen. As would be understood by one of skill in the art, the temperature required to solubilize a given polyvinyl alcohol is, in part, a function of the percent hydrolysis of the particular polyvinyl alcohol.

For example, it is suggested in the data sheets provided with the various Airvol® products of Air Products and Chemicals, Inc., that, partially hydrolyzed polyvinyl alcohol, e.g., Airvol® 540, be heated to at least about 85° C., fully hydrolyzed polyvinyl alcohol, e.g., Airvol® 350, be heated to at least about 93° C., and superhydrolyzed polyvinyl alcohol be heated to at least about 96° C. Therefore, one of skill in the art, based upon, in part, the extent of hydrolysis of a given polyvinyl alcohol, would be able to determine, for a preferred embodiment, a useful temperature for solubilization of such a polyvinyl alcohol from the ranges described herein.

Any suitable concentration of 4-vinyl pyridine monomer may be used in the polymerization process of the present invention. As would be understood by one of skill in the art, the amount chosen would generally reflect the desired resultant polymer, e.g., weight average molecular weight, for any particular application.

In a preferred embodiment of the present invention, the amount of 4vinyl pyridine monomer is from about 0.5% by weight to about 10% by weight. In another preferred embodiment of the present invention, the amount of 4-vinyl pyridine monomer is from about 2% by weight to about 8% by weight. In a particularly preferred embodiment of the present invention, the amount of 4-vinyl pyridine monomer is from about 2% by weight to about 4% by weight.

As is known in the art, vinyl pyridine monomer is substantially insoluble in water. However, as would be appreciated by those of skill in the art, the amount of vinyl pyridine monomer may be selected, such that, a majority of the vinyl pyridine monomer is solubilized in water. For example, in a particularly preferred embodiment of the present invention, the amount of 4-vinyl pyridine monomer is from about 2% by weight to about 4% by weight of 4-vinyl pyridine monomer which allows for a majority of the 4-vinyl pyridine monomer to be soluble in water.

Any suitable water-soluble initiator capable of decomposing to give cationic or nonionic free radicals may be used in the polymerization process of the present invention. Aforementioned U.S. Pat. No. 3,507,84 describes, that, in the polymerization system therein, some small amount of vinyl pyridine monomer may be dissolved in the aqueous phase of that system; however, it is critical to the polymerization process described therein, as stated therein, that, the initiator be soluble in the oil phase of that system. By contrast, the polymerization process of the present invention uses a water-soluble initiator that need not be soluble in oil.

The water-soluble initiator may be used in any suitable amount in the present invention. As would be understood by those of skill in the art, the amount of any given initiator would generally be chosen as a few mol % of the selected amount of 4-vinyl pyridine monomer. As would also be appreciated by those of skill in the art, the amount of initiator should be selected to enable uniform initiation of the polymerization process.

For example, in a preferred embodiment of the present invention, the amount of water-soluble initiator is from about 0.5 mol % to about 4.0 mol % of 4vinyl pyridine monomer.

In a particularly preferred embodiment of the present invention, the amount of water-soluble initiator is from about 1.0 mol % to about 1.5 mol % of 4vinyl pyridine monomer.

In an especially preferred embodiment of the present invention, the amount of water-soluble initiator is about 1.3 mol % of 4-vinyl pyridine monomer.

As stated earlier, when it is desirable to destroy any remaining water-soluble initiator in the resultant fluid of the polymerization process of the present invention, such as, for example, prior to the use of the resultant fluid in a preferred embodiment as a coating fluid for image-recording materials or ink jet recording sheets, one may do so, for example, by heating the resultant fluid to from about 90° C. to about 100° C. for from about thirty (30) minutes to about two (2) hours. As would be appreciated by those of skill in the art, the decomposition rate of any given water-soluble initiator is, in part, a function of the temperature to which it is heated, and therefore, one of skill in the art would be able to select a suitable temperature to achieve a suitable rate for any particular application.

As would be understood by those of skill in the art, poly-4-vinylpyridine is essentially insoluble in water. While the resultant fluid of step (a) through step (c), or, step (a') through step (c'), may be used, in a preferred embodiment as a coating fluid, when it is preferred to coat a homogenous solution of poly-4-vinylpyridine, the solubility of poly-4-vinyl-pyridine may be rendered more water-soluble by, for example, adding an acid to the resultant fluid, for example, such as described above in step (f).

When it is preferred to perform step (f), it is preferred to use lactic acid or acetic acid, and, particularly preferred to use lactic acid. As would be appreciated by those of skill in the art, the amount of acid is relative to the amount of poly-4-vinylpyridine comprising the resultant fluid of the polymerization process of the present invention. For example, in a preferred embodiment the acid of step (i) is added in the amount of a ratio of at least about 40% by weight of the 4-vinyl pyridine monomer.

As stated earlier, the process of polymerizing 4-vinyl pyridine monomer comprises the steps of contacting an aqueous solution of a polyvinyl alcohol with less than about 10% by weight of 4-vinyl pyridine monomer and a water-soluble initiator.

The aqueous solution of a polyvinyl alcohol, less than about 10% by weight of 4-vinyl pyridine monomer and water-soluble initiator may be added to one another in any suitable order, such as, for example, the aqueous solution of a polyvinyl alcohol may be contacted with the 4-vinyl pyridine monomer, and then, the resultant mixture further contacted with the water-soluble initiator, or, the aqueous solution of a polyvinyl alcohol may be contacted with the water-soluble initiator, and then, the resultant mixture further contacted with the 4-vinyl pyridine monomer.

When it is preferred to contact the aqueous solution of a polyvinyl alcohol with the 4-vinyl pyridine monomer, and then, to further contact the resultant mixture with the water-soluble initiator, the process of polymerizing 4-vinyl pyridine in a polymerization system which contains from about 80% to about 93% by weight of water, includes the steps of (a) preparing an aqueous solution of from about 2% by weight to about 10% by weight of a polyvinyl alcohol, and heating said solution to a temperature of from about 40° C. to less than about 100° C.;

(b) adding less than about 10% by weight of 4-vinyl pyridine monomer to said polyvinyl alcohol solution while maintaining said temperature; and (c) adding an essentially oxygen-free, 10% aqueous solution of a water-soluble initiator, said water-soluble initiator being present in an amount from about 0.5 mol % to about 4.0 mol % of said 4-vinyl pyridine monomer, to the mixture of step (b), at about said temperature, and incubated for from about one (1) hour to about three (3) hours at about said temperature.

Alternatively, when it is preferred to contact the aqueous solution of a polyvinyl alcohol with the water-soluble initiator, and then, to further contact the resultant mixture with the 4-vinyl pyridine monomer, the process of polymerizing 4vinyl pyridine in a polymerization system which contains from about 80% to about 93% by weight of water, includes the steps of:

(a') preparing an aqueous solution of from about 2% by weight to about 10% by weight of a polyvinyl alcohol, and heating said polyvinyl alcohol solution to a temperature from about 40° C. to less than about 100° C.;

(b') adding an essentially oxygen-free, 10% aqueous solution of a water-soluble initiator, said water-soluble initiator being present in an amount from about 0.5 mol % to about 4.0 mol % of said 4-vinyl pyridine monomer, to the aqueous solution of a polyvinyl alcohol, at about said temperature, while maintaining said temperature; and (c') slowly adding less than about 10% by weight of 4-vinyl pyridine monomer to the mixture of step (b') and incubating for from about one (1) hour to about three (3) hours at about said temperature.

As previously described herein, the resultant fluid of the polymerization process of the present invention may be used in a variety of applications, such as, for example, in preferred embodiments to coat image- and ink-receiving layers of image-recording materials and ink jet recording sheets, respectively.

A preferred embodiment of the present invention wherein the resultant fluid is used to coat an ink-receiving layer of an ink jet recording material will now be described in detail.

In such a preferred embodiment, the amounts of the components of the polymerization process are chosen, such that, when the resultant fluid of the polymerization process is incorporated in such an ink-receiving layer of an ink jet recording sheet, such as, for example, those disclosed and claimed in copending and commonly-assigned, U.S. patent application Ser. No. 08/843,736 filed on even date herewith, a visually-desirable and maintainable image is formed that possesses desirable surface characteristics, such as, for example, the high gloss and smooth feel of a conventional silver halide-based photographic printing paper.

In such a preferred embodiment, it is preferred to use amounts of the polyvinyl alcohol, preferably, Airvol® 350 or Airvol® 540, 4-vinyl pyridine monomer and water-soluble initiator, preferably, 2,2'-azobis(2-amidinopropane) hydrochloride, in the polymerization process, such, that, the preferred weight average molecular weight of the resultant poly-4-vinylpyridine is from about 200,000 to about 250,000.

In addition, in such a preferred embodiment, it is preferred to destroy any remaining water-soluble initiator, and to coat a homogeneous solution. Hence, it is preferred, in such an embodiment, to perform step (d) through step (f) of the polymerization process of the invention to solubilize the poly-4-vinylpyridine. When it is preferred, such as in the embodiment being described, to perform step (f) for the purpose of solubilizing the poly-4-vinylpyridine for, e.g., coating image- or ink-receiving layers from homogeneous solutions of the polymer, it is preferred to use a volatile acid, such, as, for example, acetic acid.

Accordingly, in such a preferred embodiment, wherein the resultant fluid, as a homogeneous solution, is intended to be used to coat an ink-receiving layer of an ink jet recording sheet to obtain a visually-desirable and maintainable image that possesses desirable surface characteristics including the high gloss and smooth feel of a conventional silver halide-based photographic printing paper, it is preferred to use from about 2% by weight to about 5% by weight of 4-vinyl pyridine monomer, polyvinyl alcohol in the amount of a ratio by weight of polyvinyl alcohol to 4-vinyl pyridine monomer of 2:1, water-soluble initiator in the amount of from about 1 mol % to about 1.5 mol % of 4-vinyl pyridine monomer and lactic acid in an amount of from at least about 40% by weight of 4-vinyl pyridine monomer.

Further, when the resultant fluid of the polymerization process of the present invention, is used to coat, using any suitable method of coating known to the art, in preferred embodiments, either ink-receiving layers of ink jet recording sheets or image-receiving layers of image-recording materials, any suitable additives known in the art for use in ink- or image-receiving layers may be further included in the resultant fluids of the polymerization process of the present invention, such as, for example, ultraviolet absorbers, antioxidants, humectants, bactericides, fungicides, crosslinking agents, dispersing agents, surfactants, lubricants, plasticizers, defoaming agents, coating aids, pigments, and so forth.

Moreover, any desirable changes may be made to the resultant fluid prior to, e.g., coating, such as, for example, a raising or lowering of the pH, to optimize the conditions necessary to achieve the desired results, e.g., high quality image, durable image, sensitometric parameters, low background or $D_{min}$, maximum optical density ($D_{max}$), and the like.

Any suitable method of applying heat may be used in the present invention to provide the temperatures necessary for the various steps of the polymerization process of the present invention.

The invention will now be described further in detail with respect to specific preferred embodiments by way of examples, it being understood that these are intended to be illustrative only and the invention is not limited to the materials, conditions, process parameters, etc. recited therein. All parts and percentages recited are by weight unless otherwise stated.

EXAMPLE I 310.6 kg of polyvinyl alcohol (Airvol® 350, fully hydrolyzed) was solubilized in 5466 L of deaerated, deionized water at about 95° C. under nitrogen for about forty-five minutes (45), and then, cooled to about 65° C.

163.2 kg of 4-vinyl pyridine monomer (Reilly Industries, Inc) and 75.6 L of deaerated, deionized water were added to the polyvinyl alcohol solution at about 65° C. and stirred for about forty-five (45) minutes.

Next, 4.4 kg of water-soluble initiator (V50®) in 37.8 L of deaerated, deionized water was added to the solution containing the polyvinyl alcohol and the 4-vinyl pyridine monomer to initiate polymerization, which was allowed to proceed for about three (3) hours at about 65° C.

The weight average molecular weight of the poly-4-vinylpyridine produced by the above polymerization process, determined by gel permeation chromatography (poly-2-vinylpyridine standard), is about 250,000.

The residual 4-vinyl pyridine monomer concentration, determined by gas chromatography (10% polyethyleneglycol, 2% potassium hydroxide, glass column, ¼" by 12'), is 97 parts per million (ppm).

Since it was intended to use the resultant fluid produced by the above process to coat, from a homogeneous solution thereof, an ink-receiving recording layer of an ink jet recording sheet, the resultant fluid was heated to about 90° C. for thirty (30) minutes to destroy any remaining V50®.

After cooling the resultant fluid to about 60° C., 72.8 kg of 88% lactic acid and 1243 L of deionized water were added with stirring for thirty (30) minutes while maintaining the solution at about 60° C. to solubilize the 4-polyvinylpyridine, and then, cooled to room temperature.

As will be appreciated from the data reported in this Example, no appreciable residual 4-vinyl pyridine monomer remains in the resultant fluid of the polymerization process, i.e., less than 0.01% by weight, which is generally about a 10-fold reduction in resultant vinyl pyridine monomer when compared to the data reported in aforementioned U.S. Pat. No. 3,507,846. It is thought that this reduction is due to a more homogeneous initiation derivable from the water solubility of the water-soluble initiator, and the amount of 4-vinyl pyridine monomer selected in the polymerization process of the present invention.

Experimentation has shown, for example, that, when the above-prepared coating fluid is used to coat an ink-receiving layer of an ink jet recording sheet, albeit with the other ingredients deemed necessary by those of skill in the art, the uniformity of black areas of the image produced on the ink jet recording sheet is appreciably improved, as described in copending and commonly-assigned, U.S. patent application Ser. No. 08/843,736 filed on even date herewith.

Further experimentation has shown, that, for example, when the above-prepared coating fluid is used to coat an image-receiving layer of an image-recording material, albeit with the other ingredients deemed necessary by those of skill in the art, a desirable $D_{min}$ or background is exhibited.

EXAMPLE II 2.6 kg of polyvinyl alcohol (Airvol® 540, partially hydrolyzed) was solubilized in 41 kg of deaerated, deionized water at about 95° C. under nitrogen.

1.37 kg of 4-vinyl pyridine monomer (Reilly Industries, Inc.) was added to the polyvinyl alcohol solution, and the temperature was increased to 65° C.

Next, 44 g of water-soluble initiator (V50®) in 730 g of deaerated, deionized water was added to the solution containing the polyvinyl alcohol and the 4-vinyl pyridine monomer to initiate polymerization, which was allowed to proceed for about three (3) hours at about 65° C.

The weight average molecular weight of the poly-4-vinylpyridine produced by the above polymerization process, determined by gel permeation chromatography (poly-2-vinylpyridine standard), is about 215,000.

The residual 4-vinyl pyridine monomer concentration, determined by gas chromatography (10% polyethyleneglycol, 2% potassium hydroxide, glass column, ¼" by 12'), is 42 ppm.

Since it was intended to use the resultant fluid produced by the above process to coat, from a homogeneous solution thereof, an ink-receiving recording layer of an ink jet recording sheet, the resultant fluid was heated to about 90° C. for thirty (30) minutes to destroy any remaining V50®.

After cooling the polymerization solution to about 60° C., 565 g of 88% lactic acid and 1 kg of deionized water were added with stirring for thirty (30) minutes while maintaining the solution at about 60° C. to solubilize the 4-polyvinylpyridine, and then, cooled to room temperature.

As will be appreciated from the data reported in this Example, no appreciable residual 4-vinyl pyridine monomer remains in the resultant fluid of the polymerization process, i.e., less than 0.01% by weight.

Experimentation has shown, for example, that, when the above-prepared coating fluid is used to coat an ink-receiving layer of an ink jet recording sheet, albeit with the other ingredients deemed necessary by those of skill in the art, the uniformity of black areas of the image produced on the ink jet recording sheet is appreciably improved while providing desirable surface characteristics, such as, for example, smoothness, glossiness, waterfastness and feel, as described in copending and commonly-assigned, U.S. patent application Ser. No. 08/843,736 filed on even date herewith.

Both of the resultant dispersions prepared by the novel process of the present invention, upon visual examination, exhibited no appreciable settling, and, therefore, are considered to contain poly-4-vinylpyridine of homogeneous particle size.

Although the invention has been described in detail with respect to various preferred embodiments thereof, those skilled in the art will recognize that the invention is not limited thereto but rather that variations and modifications can be made which are within the spirit of the invention and the scope of the appended claims.

What is claimed is:

1. A process of polymerizing 4-vinyl pyridine monomer in an aqueous polymerization system which comprises preparing an aqueous solution of polyvinyl alcohol by heating said polyvinyl alcohol in essentially oxygen-free water in an inert atmosphere, and contacting said aqueous solution of a polyvinyl alcohol with less than about 10% by weight of 4-vinyl pyridine monomer and a water-soluble initiator capable of decomposing to give free radicals.

2. A process as defined in claim 1 wherein said 4-vinyl pyridine monomer is from about 2% to about 8%, by weight.

3. A process as defined in claim 2 wherein said 4-vinyl pyridine monomer is from about 2% to about 4%, by weight.

4. A process as defined in claim 1 wherein said polymerization system contains from about 80% to about 93% by weight of water.

5. A process as defined in claim 1 wherein the ratio of said polyvinyl alcohol to said 4-vinyl pyridine monomer is from about 4:1 to about 1:2, by weight.

6. A process as defined in claim 5 wherein said ratio is about 2:1.

7. A process as defined in claim 1 wherein said water-soluble initiator is from about 0.5 mol % to about 4.0 mol % of said 4-vinyl pyridine monomer.

8. A process as defined in claim 7 wherein said water-soluble initiator is from about 1 mol % to about 1.5 mol % of said 4-vinyl pyridine monomer.

9. A process as defined in claim 1 wherein said water-soluble initiator is 2,2'-azobis(2-amidinopropane) hydrochloride.

10. A process as defined in claim 1 wherein said heating is at from about 85° C. to about 100° C.

11. A process as defined in claim 10 wherein said polyvinyl alcohol is from about 2% to about 10%, by weight.

12. A process as defined in claim 11 wherein said polyvinyl alcohol is from about 2% to about 8%, by weight.

13. A process as defined in claim 1 further comprising, after said contacting, heating to from about 90° C. to about 100° C.

14. A process as defined in claim 1 further comprising, after said contacting, adding an aqueous solution of an acid, said aqueous solution of said acid being at least about 40% by weight of said 4-vinyl pyridine.

15. A process as defined in claim 14 wherein said acid is selected from the group consisting of acetic acid and lactic acid.

16. A process as defined in claim 15 wherein said acid is lactic acid.

17. A process as defined in claim 13 further comprising, after said heating, adding an aqueous solution of an acid, said aqueous solution of said acid being at least about 40% by weight of said 4-vinyl pyridine.

18. A process as defined in claim 1 wherein said contacting is at from about 40° C. to less than about 100° C.

19. A process of polymerizing 4-vinyl pyridine monomer in a polymerization system which comprises an aqueous solution of a polyvinyl alcohol and contains from about 80% to about 93% by weight of water, which comprises, in sequence:

solubilizing from about 2% by weight to about 10% by weight of a polyvinyl alcohol in essentially oxygen-free water at from about 85° C. to about 100° C. in an inert atmosphere, and then, cooling to a temperature of from about 40° C. to less than about 100° C.;

adding less than about 10% by weight of 4-vinyl pyridine monomer to said solubilized polyvinyl alcohol, and maintaining said temperature; and adding an essentially oxygen-free, 10% aqueous solution of a water-soluble initiator capable of decomposing to give free radicals, said water-soluble initiator being from about 0.5 mol % to about 4.0 mol % of said 4-vinyl pyridine monomer.

20. A process as defined in claim 19 further including, after said water-soluble initiator is added, in sequence: heating to from about 90° C. to about 100° C., and adding an aqueous solution of an acid, said aqueous solution of said acid being at least about 40% by weight of said 4-vinyl pyridine.

21. A process as defined in claim 20 wherein said 4-vinyl pyridine monomer is from about 2% to about 4%, by weight, the ratio of said polyvinyl alcohol to said 4-vinyl pyridine monomer is about 2:1, by weight, said water-soluble initiator is 2,2'-azobis(2-amidinopropane) hydrochloride and is from about 0.5 mol % to about 4.0 mol % of said 4-vinyl pyridine monomer, and said acid is selected from the group consisting of acetic acid and lactic acid.

* * * * *